United States Patent
Sun et al.

(10) Patent No.: US 9,226,336 B2
(45) Date of Patent: Dec. 29, 2015

(54) WIRELESS NETWORK AREA LIMITING METHOD AND SYSTEM BASED ON NEAR FIELD COMMUNICATION

(71) Applicants: Yan Sun, Beijing (CN); Wei Wang, Beijing (CN); Bin Da, Beijing (CN); Linju Yang, Beijing (CN); Haihua Yu, Beijing (CN)

(72) Inventors: Yan Sun, Beijing (CN); Wei Wang, Beijing (CN); Bin Da, Beijing (CN); Linju Yang, Beijing (CN); Haihua Yu, Beijing (CN)

(73) Assignee: RICOH COMPANY, LTD., Tokyo (JP)

(*) Notice: Subject to any disclaimer, the term of this patent is extended or adjusted under 35 U.S.C. 154(b) by 87 days.

(21) Appl. No.: 14/168,118

(22) Filed: Jan. 30, 2014

(65) Prior Publication Data
US 2014/0219262 A1    Aug. 7, 2014

(30) Foreign Application Priority Data
Feb. 5, 2013    (CN) .......................... 2013 1 0045923

(51) Int. Cl.
| | |
|---|---|
| H04W 84/02 | (2009.01) |
| H04W 12/04 | (2009.01) |
| H04L 9/08 | (2006.01) |
| H04W 84/12 | (2009.01) |
| H04W 4/00 | (2009.01) |
| H04W 4/02 | (2009.01) |
| H04L 29/06 | (2006.01) |

(52) U.S. Cl.
CPC .................. *H04W 84/12* (2013.01); *H04L 9/08* (2013.01); *H04W 4/008* (2013.01); *H04W 4/021* (2013.01); *H04W 12/04* (2013.01); *H04L 63/0846* (2013.01)

(58) Field of Classification Search
None
See application file for complete search history.

(56) References Cited

U.S. PATENT DOCUMENTS

| | | | |
|---|---|---|---|
| 8,116,679 B2 | 2/2012 | Dunko | |
| 2009/0168695 A1 | 7/2009 | Johar et al. | |
| 2012/0077431 A1* | 3/2012 | Fyke et al. | 455/41.1 |
| 2013/0086652 A1* | 4/2013 | Kavantzas et al. | 726/5 |
| 2013/0336484 A1 | 12/2013 | Sun et al. | |
| 2013/0336485 A1 | 12/2013 | Da et al. | |

FOREIGN PATENT DOCUMENTS

| | | |
|---|---|---|
| CN | 101483872 A | 7/2009 |
| CN | 102144421 A | 8/2011 |

* cited by examiner

*Primary Examiner* — Omar Ghowrwal
(74) *Attorney, Agent, or Firm* — IPUSA, PLLC

(57) ABSTRACT

Disclosed are a wireless network area limiting method and a wireless network area limiting system based on NFC. The wireless network area limiting method includes a step of adopting a plurality of first NFC hot spot sensors to seamlessly define a limited area having any shape; a step of periodically generating and transmitting an area secret key by a first central control part respectively connected to the plurality of first NFC hot spot sensors; and a step of conducting handshake with the first central control part by a WLAN user equipment, which has a NFC function and is located in the limited area, based on the area secret key received by the WLAN user equipment, so that the first central control part establishes area-limited network communications in the limited area.

15 Claims, 7 Drawing Sheets

WIRELESS NETWORK AREA LIMITING METHOD AND SYSTEM BASED ON NEAR FIELD COMMUNICATION

BACKGROUND OF THE INVENTION

1. Field of the Invention

The present invention relates to a wireless network area limiting method and a wireless network area limiting system on the basis of near field communication (NFC).

2. Description of the Related Art

A wireless communications device has been widely used so far. This kind of wireless communications device includes, for example, a cellular phone, a tablet computer, a notebook computer, or a personal digital assistant (PDA). Users may obtain various information via the wireless communications devices, and may carry out data exchange between them. However, although the wireless communications device is very convenient for communications, at the same time, there are serious security concerns. For example, in a public place such as a coffee shop, it is very important to take into account the security of information sharing when people conduct data exchange via the wireless communications devices. That is to say, it is very necessary to limit a safe wireless network area.

For this purpose, in order to guarantee the security of wireless network connection, for example, a wireless network protocol is used to protect the security of wireless network connection by requiring a password for network access and performing MAC address filtering. However, there still is a problem of hacker attack. Generally speaking, a hacker may steal most of passwords by carrying out a large amount of calculation. For example, when an authorized user broadcasts a password for accessing a wireless network, the password may be stolen by a hacker. Furthermore, the MAC address filtering may also be cracked by using a fake user-defined MAC address generated by special purpose software.

As a result, the best way to protect a wireless network is preventing wireless network signal leakage when a wireless network signal is utilized. In other words, it is best to establish a wireless network only in a limited area such as a house, an office, a warehouse, or a building. In this case, if a hacker wants to steal a password, he must stay in the limited area where the wireless network is established. Thus, it may be said that wireless network protection extends to security protection of a physical place where a wireless network is established.

In Chinese Patent Application Publication No. 102144421A1, a method of promoting connection to a wireless local area network (WLAN) on the basis of NFC is disclosed. The aim of this method is to simplify, by utilizing the NFC, a complex interactive process when a device carries out connection to the WLAN. In particular, a NFC device is connected to a controller of a mobile communications device so as to input data received by the NFC device to the controller for processing. A user may put the mobile communications device near the NFC device located in a designated area where the WLAN is built, so that the NFC is set up. In this way, it is possible to send information related to the WLAN to a NFC reader of the mobile communications device by utilizing the NFC. Moreover, the mobile communications device does not need to search the WLAN continuously. The controller may determine whether the mobile communications device is a subscriber of the WLAN service provider, and may decide on the basis of the determined result whether or not to carry out data exchange over the WLAN. As a result, it is obvious that in this method, the NFC is just for collecting data, a safe physical area is not built, and it is necessary to predetermine wireless network information by a mobile communications device for conducting data exchange over the WLAN.

In Chinese Patent Application Publication No. 101483872A, a method of defining wireless network boundaries by utilizing a physical access control system (PACS) is disclosed. In this method, the PACS is configured to define boundaries in a wireless coverage area, and to only allow a device located in the area limited by the boundaries to access the corresponding wireless network. In particular, a control system comprises the PACS configured to control an authorized user to enter the safe area limited by the boundaries; and a wireless network generation system configured to generate a wireless network. If it is determined that an authorized user is located in the safe area, then a device related to the authorized user is allowed to access the wireless network. On the other hand, if it is determined that the authorized user has departed from the safe area, then the device related to the authorized user is not allowed to access the wireless network. However, in this method, the ID of a mobile communications device is registered in the control system in a card reading manner, and the mobile communications device is considered located in the safe area. As a result, it is obvious that the NFC is not involved in the method, and there isn't a predetermined safe physical area. That is to say, a virtual safe area is obtained by the ID registration of a mobile communications device when the mobile communications device enters a certain spatial area.

On the basis of the above, in order to guarantee the security of information exchange, the so-called "near field communication (NFC)" is adopted. The NFC is a short-distance high-frequency wireless communications technique for carrying out data exchange between devices whose distance from each other is small enough. By limiting a user involved in the communications in a certain range, it is possible to ensure the security of communications and data exchange.

In addition, at present, there, is also another indoor area limiting method in which light emitting diodes or infrared light transmitters are utilized. However, these kinds of optical signals are not stable, and are sensitive to environmental conditions. As a result, the boundaries of an area limited by utilizing this kind of method are not clear enough, and the shape of the limited area cannot be adjusted easily.

SUMMARY OF THE INVENTION

In light of the above, it is necessary to set up a safe wireless network area similar to a physical space in the field of the present invention. In this way, mobile communications devices entering this kind of safe area are able to carry out data exchange freely and safely.

According to one aspect of the present invention, a wireless network area limiting method based on near field communication (NFC) is provided. The wireless network area limiting method includes a step of adopting a plurality of first NFC hot spot sensors to seamlessly define a limited area having any shape; a step of periodically generating and transmitting an area secret key by a first central control part connected to the plurality of first NFC hot spot sensors, respectively; and a step of conducting a handshake with the first central control part by a wireless local area network (WLAN) user equipment, which has a NFC function and is located in the limited area, based on the area secret key received by the WLAN user equipment, so that the first central control part establishes area-limited network communications in the limited area.

Furthermore, in the wireless network area limiting method based on the NFC, the step of conducting the handshake includes a step of detecting the WLAN user equipment which has the NFC function and is located in the limited area, and transmitting information of each of the plurality of first NFC hot spot sensors to the WLAN user equipment by the first central control part; a step of selecting optimal information from the information of the plurality of first NFC hot spot sensors, and transmitting a connection request to a first NFC hot spot sensor corresponding to the optimal information by the WLAN user equipment; and a step of, in a case where it is determined that the WLAN user equipment transmitting the connection request is located in the limited area, receiving the connection request, transmitting the area secret key to the WLAN user equipment, and receiving user information from the WLAN user equipment, so that the handshake between the first central control part and the WLAN user equipment is achieved.

Furthermore, the wireless network area limiting method based on the NFC further includes a step of repeatedly transmitting the periodically-changed area secret key to the WLAN use equipment in a handshake state by the first central control part.

Furthermore, the wireless network area limiting method based on the NFC further includes a step of connecting the first central control part and at least one second central control part so as to expand the limited area.

According to another aspect of the present invention, a wireless network area limiting system based on near field communication (NFC) is provided. The wireless network area limiting system includes a plurality of first NFC hot spot sensors configured to seamlessly define a limited area having any shape; a first central control part configured to be connected to the plurality of first NFC hot spot sensors, respectively, and to periodically generate and transmit an area secret key; and a wireless local area network (WLAN) user equipment configured to have a NFC function, to be located in the limited area, and to conduct a handshake with the first central control part based on the area secret key received by the WLAN user equipment, so that the first central control part establishes area-limited network communications in the limited area.

Furthermore, in the wireless network area limiting system based on the NFC, the first central control part detects the WLAN user equipment which has the NFC function and is located in the limited area, and transmits information of each of the plurality of first NFC hot spot sensors to the WLAN user equipment; the WLAN user equipment selects optimal information from the information of the plurality of first NFC hot spot sensors, and transmits a connection request to a first NFC hot spot sensor corresponding to the optimal information; and the first central control part, in a case where it is determined that the WLAN user equipment transmitting the connection request is located in the limited area, receives the connection request, transmits the area secret key to the WLAN user equipment, and receives user information from the WLAN user equipment, so that the handshake between the first central control part and the WLAN user equipment is achieved.

Furthermore, the wireless network area limiting system based on the NFC further includes at least one second central control part; and a plurality of second NFC hot spot sensors connected to the at least one second central control part, respectively. The first central control part and the at least one second central control part are connected so as to expand the limited area.

Furthermore, in the wireless network area limiting system based on the NFC, the first central control part generates, by being connected to each of the plurality of first NFC hot spot sensors, coordinates and an identification (ID) of the corresponding first NFC hot spot sensor.

Furthermore, in the wireless network area limiting system based on the NFC, the area secret key is generated based on secret key information, area information, and the user information.

Furthermore, the wireless network area limiting system based on the NFC manages node information of the corresponding WLAN, and carries out interactive communications with the user equipment.

As a result, in the present invention, it is possible to limit a safe wireless network area by utilizing the NFC. As described above, the NFC is a short-distance high-frequency wireless communications technique, and particularly it requires that the corresponding distance is less that 5 cm. In the above-described wireless network area limiting method and system, there are some advantages as follows:

Since a NFC hot spot sensor may define an obvious boundary, and has a short-distance transmission feature, by utilizing a plurality of NFC hot spot sensors, it is possible to make the boundaries of a wireless network area limited by the plurality of NFC hot spot sensors clearer, and to easily adjust the shape of the limited wireless network area.

Since the NFC has relatively perfect standards, and may perform stable communications, the limited wireless network area is robust, i.e., environmental conditions cannot easily influence the limited wireless network area.

Since most of mobile communications devices support the NFC, and because the NFC allows two-way communications, it is possible to conduct safe information exchange by utilizing the NFC, and it is possible to perform management of node information.

Furthermore, in the view of application, by utilizing the NFC, it is possible to achieve more applications, for example, an indoor positioning method. In addition, transmitting information via a NFC channel (layer) is safer than transmitting information via a WI-FI layer.

DETAILED DESCRIPTION OF THE PREFERRED EMBODIMENTS

In order to let those people skilled in the art better understand the present invention, hereinafter the present invention will be concretely described on the basis of the drawings and various embodiments.

Figure 1:
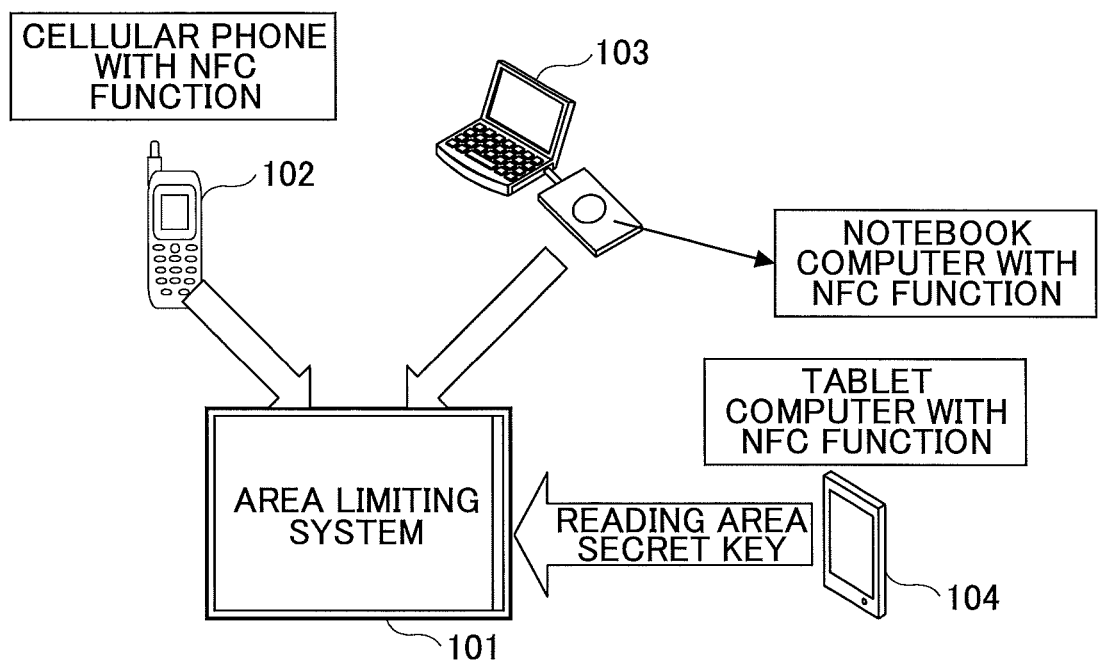
FIG. 1 illustrates a wireless network area limiting system according to an embodiment of the present invention.

FIG. 1 illustrates a wireless network area limiting system according to an embodiment of the present invention.

As shown in FIG. 1, a wireless network area limiting system (also called a "ARCS") 101 appears as a kind of limited area desktop control system, and the shape of the corresponding desktop is square. Here it should be noted that actually the shape of a limited area established by the wireless network area system 101 may be any kind of shape. For example, on the basis of actual needs, the corresponding limited area may be established to be a circle or to have an irregular shape. Additionally, the corresponding limited area may be expanded in any shape, i.e., the shape of the expanded limited area may also be any kind of shape. This will be concretely described below by referring to FIGS. 3 and 4.

The wireless network area limiting system 101 establishes the corresponding limited area by distributing plural NFC hot spot sensors (also called "first plural NFC hot spot sensors") at different positions on the basis of a predetermined shape of the corresponding limited area. After the wireless network area limiting system 101 establishes the corresponding limited area, a central control part (also called a "first central control part") of the wireless network area limiting system 101 periodically transmits an area secret key to the corresponding limited area (for example, once every 10, 15, 30, or 60 seconds). When a user equipment having a NFC sensor enters the corresponding limited area, the NFC sensor of the corresponding user equipment may be detected by the plural NFC hot spot sensors of the wireless network area limiting system 101. After that, the wireless network area limiting system 101 may carry out a handshake process with the corresponding user equipment in the corresponding limited area, and transmits the current area secret key to the corresponding user equipment by utilizing a NFC protocol. If the corresponding user equipment passes through the authentication based on the current area secret key, then the corresponding user equipment may join the corresponding wireless network. Here it should be noted that the corresponding user equipment may be, for example, a cellular phone 102, a notebook computer 103, or a tablet computer 104 as shown in FIG. 1.

Figure 2:
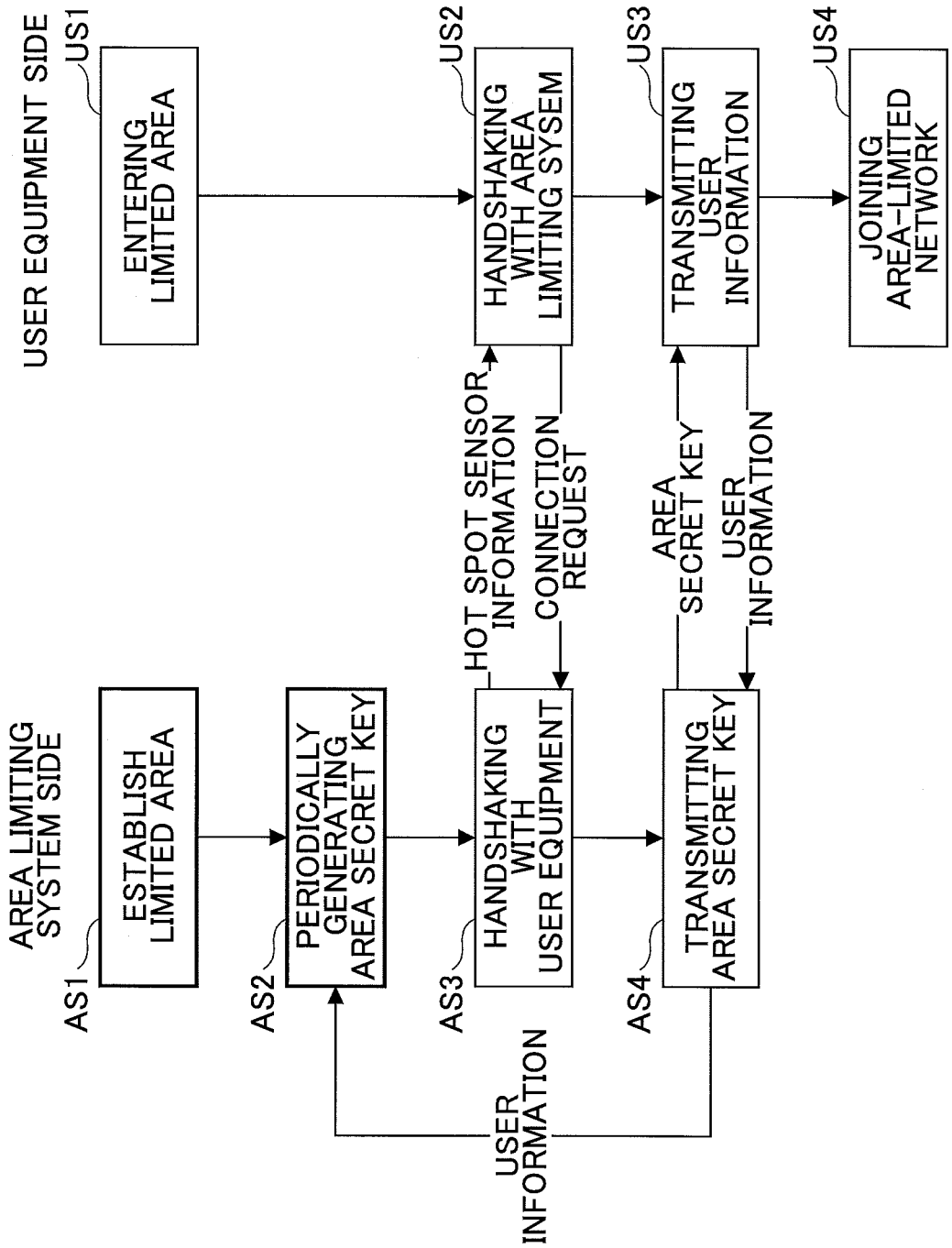
FIG. 2 is a flowchart when the wireless network area limiting system shown in FIG. 1 adopts a wireless network area limiting method according to an embodiment of the present invention.

FIG. 2 is a flowchart when the wireless network area limiting system 101 shown in FIG. 1 adopts a wireless network area limiting method according to an embodiment of the present invention.

As shown in FIG. 2, this flowchart includes two parts, namely, an operational process carried out by the wireless network area limiting system 101 and a corresponding operational process carried out by a user equipment. For the sake of convenience, in what follows, the two operational processes are not described separately, but are described according to an order of signal flow.

First, in STEP AS1, the wireless network area limiting system 101 establishes a limited area.

Figure 3:
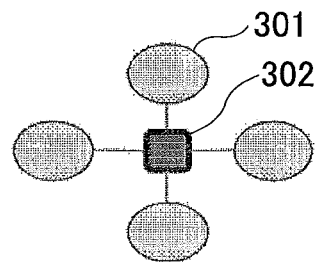
FIG. 3 illustrates a limited area established by the wireless network area limiting system shown in FIG. 1.

FIG. 3 illustrates an example of a limited area established by the wireless network area limiting system 101.

As shown in FIG. 3, the wireless network area limiting system 101 includes a central control part (also called a "first central control part") 302 and plural NFC hot spot sensors (also called "first plural NFC hot spot sensors") 301 connected to the central control part 302. Each of the plural NFC hot spot sensors 301 serves as a unit working in the wireless network area limiting system 101. Since the coverage area of the antenna of each of the plural NFC hot spot sensors 301 has a shape being the same as the shape of the corresponding antenna, by distributing the plural NFC hot spot sensors 301 according to a predetermined shape, it is possible to define a desired limited area. As a result, by seamlessly arranging the coverage area of each of the plural NFC hot spot sensors 301 so as to form a rectangle, a circle, or any other shape, it is possible to establish a desired limited area. That is to say, the shape and the boundaries of a limited area may be changed according to the arrangement of the plural NFC hot spot sensors 301.

Moreover, it is also possible to establish an expanded limited area by connecting plural limited areas as described above.

Figure 4:
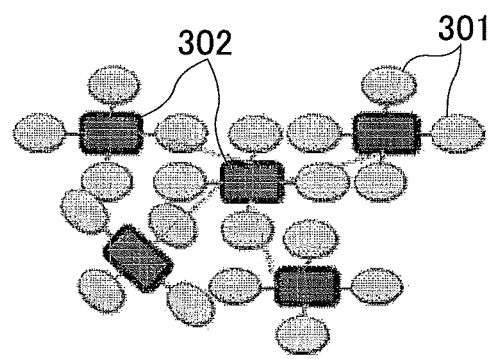
FIG. 4 illustrates an expanded limited area including plural connected limited areas.

FIG. 4 illustrates an expanded limited 101 area including plural connected limited areas as described above.

As shown in FIG. 4, an expanded limited area may correspond to an expanded wireless network area limiting system 101. In particular, any two of plural central control parts 302 are connected so as to be able to carry out communications with each other. In this way, it is possible to establish the expanded wireless network area limiting system 101. As a result, it is possible to distribute plural wireless network area limiting systems at different physical spaces, and to carry out communications between any two of them.

Furthermore, after the limited area is established, the central control part 302 of the wireless network area limiting system 101 may generate a corresponding coordinate system on the basis of the limited area.

Figure 5:
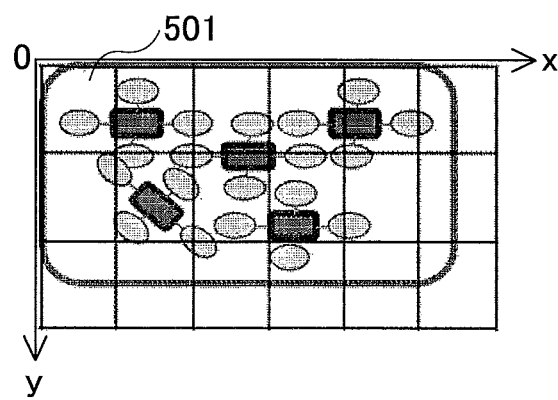
FIG. 5 illustrates a coordinate system generated in a limited area established by plural NFC hot spot sensors of the wireless network area limiting system shown in FIG. 1.

FIG. 5 illustrates a coordinate system generated in a limited area established by the plural NFC hot spot sensors 301 of the wireless network area limiting system 101.

As shown in FIG. 5, the wireless network area limiting system 101 generates a corresponding coordinate system 501. After the corresponding coordinate system 501 is generated, the central control part 302 may assign an ID to each of the plural NFC hot spot sensors 301.

Referring to FIG. 2 again. After the limited area is established, in STEP US1, a user equipment enters the limited area. Almost at the same time, STEPS US2 and AS3 are carried out. In STEPS US2 and AS3, each of the plural NFC hot spot sensors 301 of the wireless network area limiting system 101 and a NFC sensor of the user equipment detect each other, and a handshake process between the wireless network area limiting system 101 and the user equipment is automatically triggered. By employing this kind of handshake, the user equipment transmits a connection request to the wireless network area limiting system 101.

Figure 6:
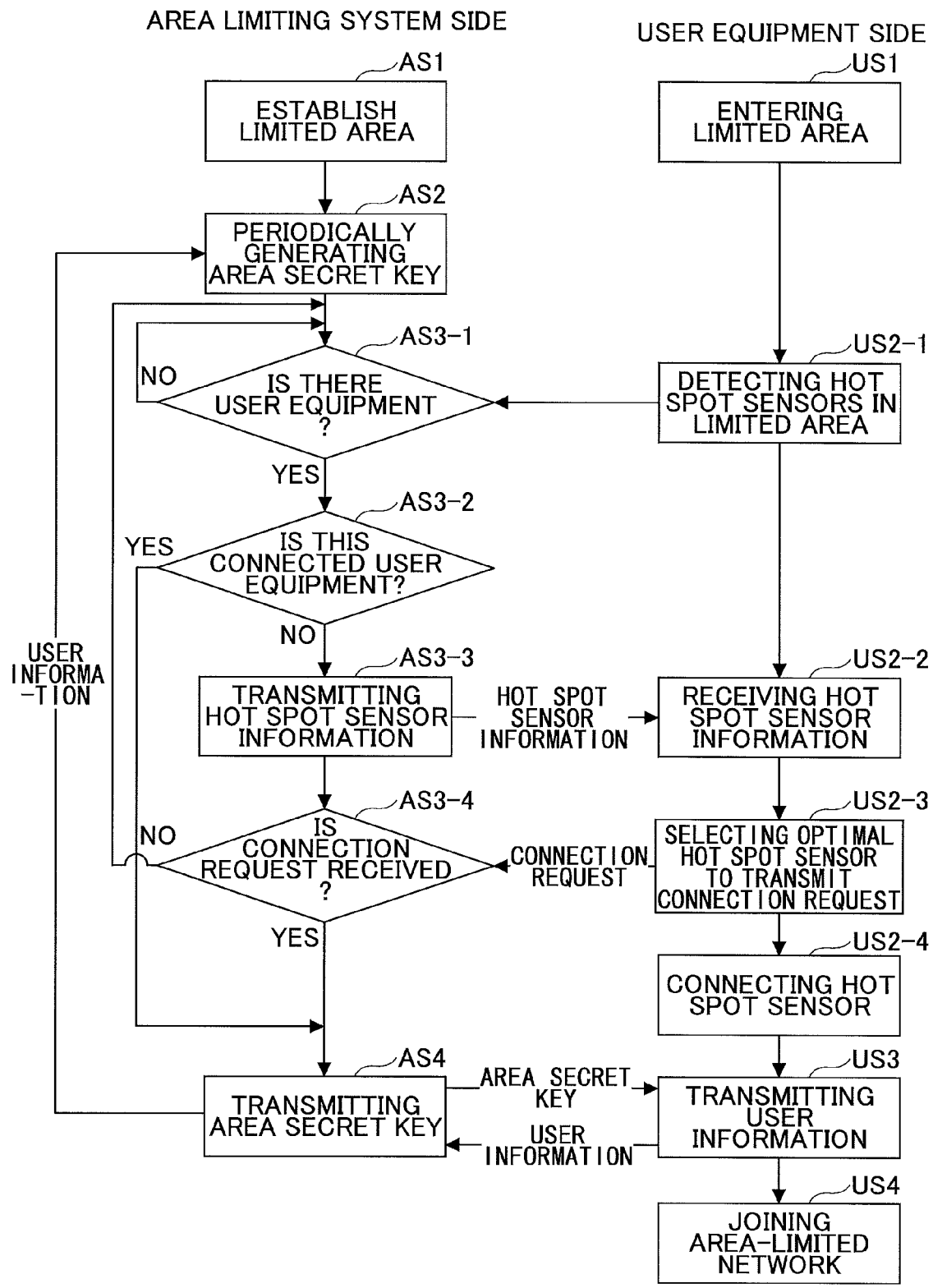
FIG. 6 is a flowchart of a handshake process between a user equipment and the wireless network area limiting system shown in FIG. 1.

FIG. 6 is a flowchart of a handshake process between an user equipment and the wireless network area limiting system 101.

As shown in FIG. 6, after STEPS AS1, AS2, and US1 shown in FIG. 2, in STEP US2-1, a user equipment enters the limited area, detects the plural NFC hot spot sensors 301 of the wireless network area system 10, and triggers the handshake process. On the other hand, in STEP AS3-1, the wireless network area limiting system 101 determines whether there is the user equipment in the limited area. If the wireless network area limiting system 101 determines that the limited area includes the user equipment, i.e., if the determination result in STEP AS3-1 is "YES", then STEP AS3-2 is carried out. In STEP AS3-2, the wireless network area limiting system 101 determines whether the user equipment is one which has been connected to the corresponding wireless network. If the determination result is "YES", then STEP AS4 is carried out, i.e., a current area secret key or an updated area secret key is continuously transmitted to the user equipment. After that, the handshake process finishes. If the determination result of STEP AS3-2 is "NO", then STEP AS3-3 is carried out. In this step, the wireless network area limiting system 101 transmits information related to each of the plural NFC hot spot sensors, and waits for a connection request from the detected user equipment. On the other hand, in STEP US2-2, the user equipment receives the information related to each of the plural NFC hot spot sensors transmitted by the wireless network area limiting system 101. This kind of information may include but is not limited to a use state of the central control part 302, NFC signal strength, or a use state of each of the plural NFC hot spot sensors. After that, in STEP US2-3, the user equipment compares the information related to the respective NFC hot spot sensors, and transmits the connection request to a NFC hot spot sensor having an optimal state. In STEP US2-4, the user equipment is connected to the NFC hot spot sensor having the optimal state. Here it should be noted that a method of determining the NFC hot spot sensor having the optimal state is, for example, "Function(Feature Information of Sensors)=Sensor ID". On the other hand, in STEP AS3-4, the wireless network area limiting system 101 determines, after receiving the connection request transmitted by the user equipment, whether the user equipment is still located in the limited area, or whether the user equipment has moved to another position in the limited area. If the determination result of this step is "YES", then the wireless network area limiting system 101 rejects the connection request, and STEP AS3-1 is carried out again. If the determination result of this step is "NO", i.e., if the position of the user equipment is unchanged, the wireless network area limiting system 101 accepts the connection request transmitted by the user equipment, and then, STEP AS4 is carried.

After that, in STEP AS4, the wireless network area limiting system 101 transmits an area secret key, and receives user information from the user equipment. Here it should be noted that the wireless network area limiting system 101 may automatically and periodically create a new area secret key (STEP AS2). On the other hand, in STEP US3, the user equipment may receive the area secret key transmitted by the wireless network area limiting system 101, and transmit its user information to the wireless network area limiting system 101. Finally, in STEP SUS4, the user equipment is connected to the wireless network area limiting system 101. Furthermore, once the user equipment departs from the limited area, since the user equipment cannot receive the area secrete key, the connection between the user equipment and the wireless network area limiting system 101 is broken.

In addition, when the above-described wireless network area limiting method is utilized in a wireless network, there are two methods of transmitting the area secret key, namely, a one-way transmission method and a two-way transmission method.

Figure 7:
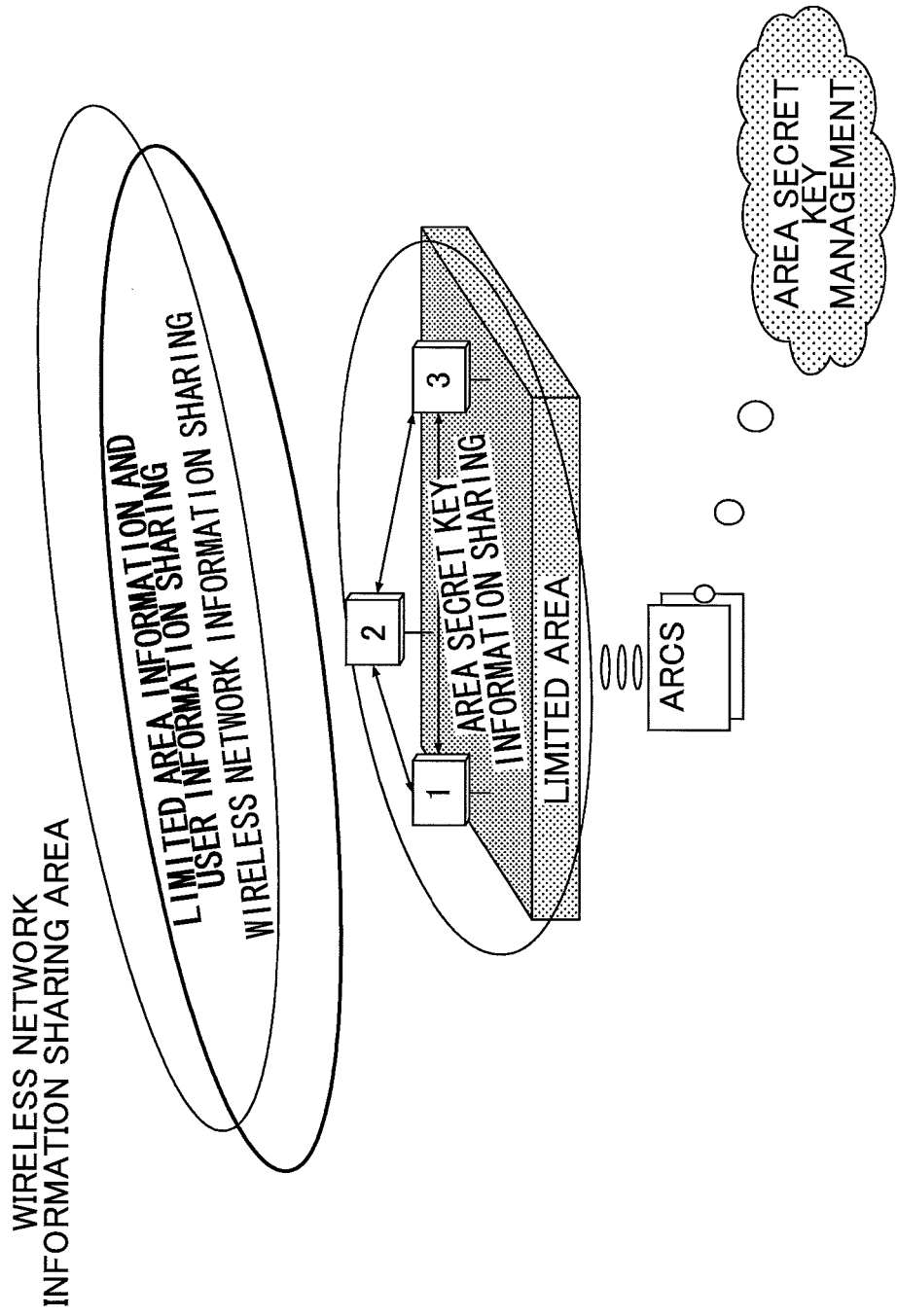
FIG. 7 illustrates a one-way transmission model of an area secret key.

FIG. 7 illustrates a one-way transmission model of an area secret key.

As shown in FIG. 7, if a user equipment enters a limited area, the user equipment may receive an area secret key, and may join a wireless network. In the corresponding wireless network layer, the information of the limited area is shared with the user information of the user equipment (the management of node information), and is carried out as the wireless network information is done in the wireless network layer. However, the area secret key management is carried out in the NFC layer of the wireless network area limiting system.

Figure 8:
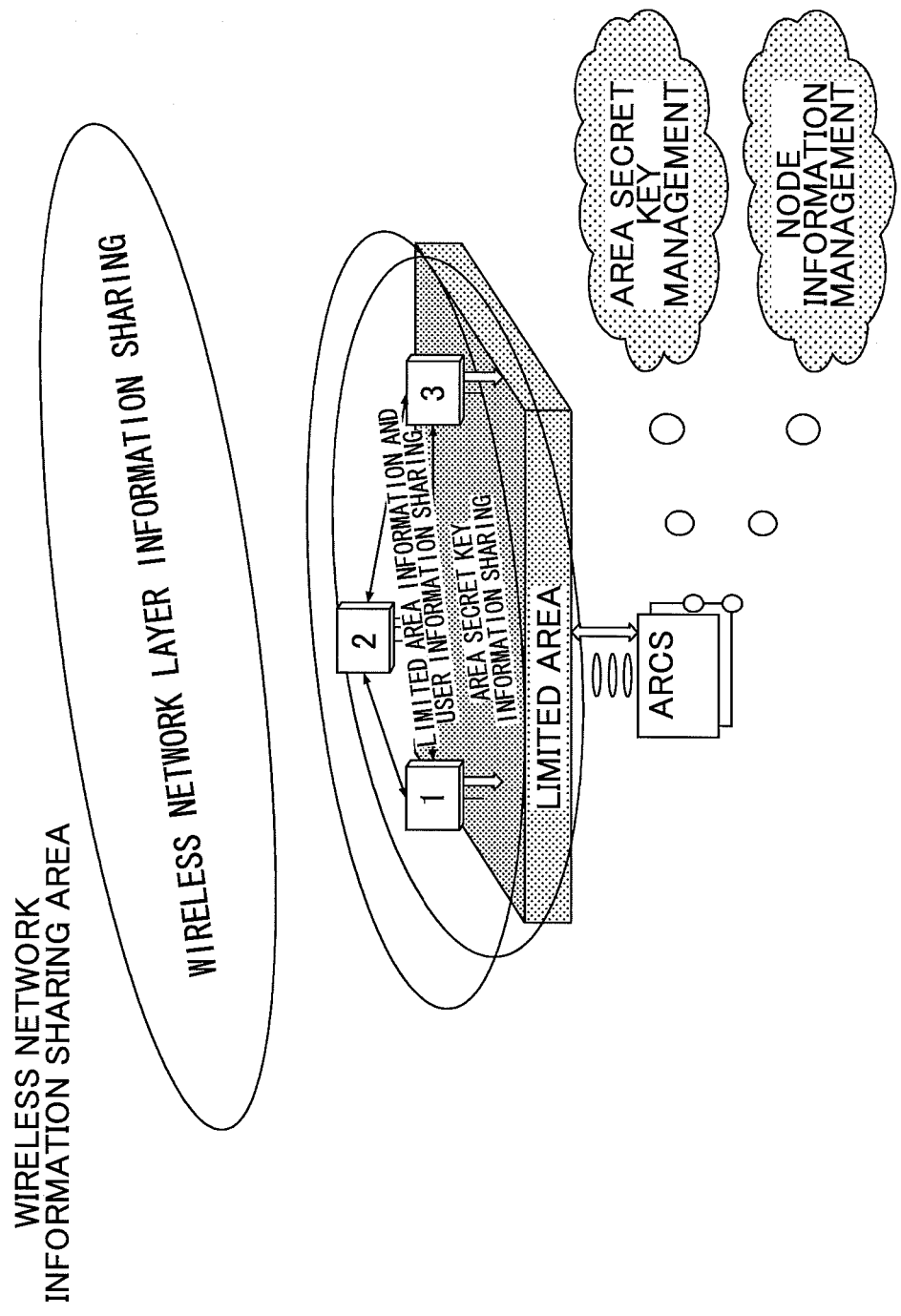
FIG. 8 illustrates a two-way transmission model of an area secret key.

FIG. 8 illustrates a two-way transmission model of an area secret key.

As shown in FIG. 8, the wireless network area limiting system 101 periodically transmits an area secret key to a limited area. When a user equipment enters the limited area, the user equipment may receive the area secret key, and join a corresponding wireless network. On the other hand, the user equipment may transmit its user information and node information to the wireless network area limiting system 101 via a NFC channel (layer). In the wireless network layer, only wireless network information is shared. The node information management and the area secret key management are carried out in the NFC data transmission layer. Since the node information is very important security information when limiting the wireless network area, it is necessary to transmit the node information via the NFC layer. The reason is that transmitting information via the NFC layer is safer than transmitting via the wireless network layer.

Figure 9:
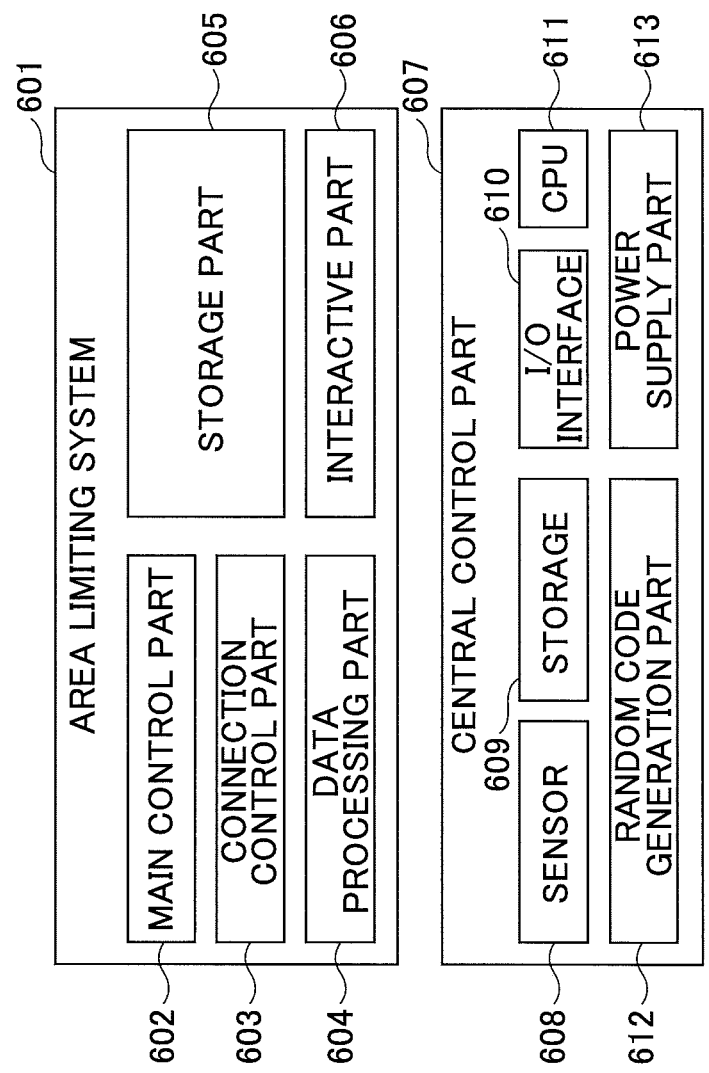
FIG. 9 is a block diagram of a wireless network area limiting system according to an embodiment of the present invention.

FIG. 9 is a block diagram of a wireless network area limiting system according to an embodiment of the present invention.

As shown in FIG. 9, the wireless network area limiting system 601 includes but is not limited to a main control part 602 configured to control other parts in the wireless network limiting system 601; a connection control part 630 configured to control a connection function of a central control part 607; a data processing part 604; a storage part 605 configured to store data such as an area secret key, a user list, user information, a sensor ID list, sensor information, or limited area establishment information; and an interactive part 606 configured to carry out interaction with a user equipment.

In addition, the central control part 607 of the wireless network area system 601 includes a NFC hot spot sensor 608 and a control part. The control part includes but is not limited to a storage 609 configured to store information such as the data generated in STEP AS2 and the information stored in the storage part 605; an input/output (I/O) interface 610 configured to be connected to an external device so as to carry out transmission of data and information, for example, the transmission of data and information carried out in STEPS AS4 and AS4; a central processing unit (CPU) 611 configured to control other parts, for example, to control calculation and the data processing part 604; a random code generation part 612 configured to generate a random code serving as an important part of an area secret key; and a power supply part 613 configured to supply electrical power to the central control part 607 of the wireless network area limiting system.

Here it should be noted that the above respective embodiments are just exemplary ones, and the specific structure and operation of each of them may not be used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Priority Patent Application No. 201310045923.4 filed on Feb. 5, 2013, the entire contents of which are hereby incorporated by reference.

What is claimed is:

1. A wireless network area limiting method based on near field communication (NFC), comprising:
   adopting a plurality of first NFC hot spot sensors to seamlessly define a limited area having any shape;
   periodically generating and transmitting an area secret key by a first central control part respectively connected to the plurality of first NFC hot spot sensors; and
   conducting a handshake with the first central control part by a wireless local area network (WLAN) user equipment, which has a NFC function and is located in the limited area, based on the area secret key received by the WLAN user equipment, so that the first central control part establishes area-limited network communications in the limited area;
   wherein the plurality of first NFC hot spot sensors are directly connected to the first central control part during the adopting the plurality of first NFC hot spot sensors to seamlessly define the limited area having any shape.

2. The wireless network area limiting method according to claim 1, wherein, conducting the handshake with the first central control part by the WLAN user equipment comprises:
   detecting the WLAN user equipment which has the NFC function and is located in the limited area, and transmitting information of each of the plurality of first NFC hot spot sensors to the WLAN user equipment by the first central control part;
   selecting optimal information from the information of the plurality of first NFC hot spot sensors, and transmitting a connection request to a first NFC hot spot sensor corresponding to the optimal information by the WLAN user equipment; and
   in a case where it is determined that the WLAN user equipment transmitting the connection request is located in the limited area, receiving the connection request, transmitting the area secret key to the WLAN user equipment, and receiving user information from the WLAN user equipment, so that the handshake between the first central control part and the WLAN user equipment is achieved.

3. The wireless network area limiting method according to claim 2, further comprising:
   repeatedly transmitting the periodically-changed area secret key to the WLAN user equipment in a handshake state by the first central control part.

4. The wireless network area limiting method according to claim 3, further comprising:
   connecting the first central control part and at least one second central control part so as to expand the limited area.

5. A wireless network area limiting system based on near field communication (NFC), comprising:
   a plurality of first hardware NFC hot spot sensors configured to seamlessly define a limited area having any shape;
   a first central control part configured to be respectively connected to the plurality of first hardware NFC hot spot sensors, and to periodically generate and transmit an area secret key; and
   a wireless local area network (WLAN) user equipment configured to have a NFC function, to be located in the limited area, and to conduct a handshake with the first central control part based on the area secret key received by the WLAN user equipment, so that the first central control part establishes area-limited network communications in the limited area;
   wherein the first central control part comprises a hardware processor;
   wherein the WLAN user equipment comprises a hardware NFC sensor; and
   wherein the plurality of first hardware NFC hot spot sensors are directly connected to the first central control part to seamlessly define the limited area having any shape.

6. The wireless network area limiting system according to claim 5, wherein:
   the first central control part detects the WLAN user equipment which has the NFC function and is located in the limited area, and transmits information of each of the plurality of first hardware NFC hot spot sensors to the WLAN user equipment;
   the WLAN user equipment selects optimal information from the information of the plurality of first hardware NFC hot spot sensors, and transmits a connection request to a first hardware NFC hot spot sensor corresponding to the optimal information; and
   the first central control part, in a case where it is determined that the WLAN user equipment transmitting the connection request is located in the limited area, receives the connection request, transmits the area secret key to the WLAN user equipment, and receives user information from the WLAN user equipment, so that the handshake between the first central control part and the WLAN user equipment is achieved.

7. The wireless network area limiting system according to claim 6, further comprising:
   at least one second central control part; and
   a plurality of second hardware NFC hot spot sensors connected to the at least one second central control part, respectively,
   wherein,
   the first central control part and the at least one second central control part are connected so as to expand the limited area; and the at least one second central control part comprises a hardware processor.

8. The wireless network area limiting system according to claim 7, wherein:
the first central control part generates, by being connected to each of the plurality of first hardware NFC hot spot sensors, coordinates and an identification (ID) of the corresponding first hardware NFC hot spot sensor.

9. The wireless network area limiting system according to claim 8, wherein:
the area secret key is generated based on secret key information, area information, and the user information.

10. The wireless network area limiting system according to claim 8, wherein:
the wireless network area limiting system manages node information of a corresponding WLAN, and carries out interactive communications with the WLAN user equipment.

11. A wireless network area limiting method based on near field communication (NFC), comprising:
adopting a plurality of first NFC hot spot sensors to seamlessly define a limited area having any shape;
periodically generating and transmitting an area secret key by a first central control part respectively connected to the plurality of first NFC hot spot sensors; and
conducting a handshake with the first central control part by a wireless local area network (WLAN) user equipment, which has a NFC function and is located in the limited area, based on the area secret key received by the WLAN user equipment, so that the first central control part establishes area-limited network communications in the limited area;
wherein conducting the handshake with the first central control part by the WLAN user equipment comprises detecting the WLAN user equipment which has the NFC function and is located in the limited area, and transmitting information of each of the plurality of first NFC hot spot sensors to the WLAN user equipment by the first central control part.

12. The wireless network area limiting method according to claim 11, wherein conducting the handshake with the first central control part by the WLAN user equipment comprises selecting optimal information from the information of each of the plurality of first NFC hot spot sensors, and transmitting a connection request to a first NFC hot spot sensor corresponding to the optimal information by the WLAN user equipment.

13. The wireless network area limiting method according to claim 12, wherein conducting the handshake with the first central control part by the WLAN user equipment comprises, in a case where it is determined that the WLAN user equipment transmitting the connection request is located in the limited area, receiving the connection request, transmitting the area secret key to the WLAN user equipment, and receiving user information from the WLAN user equipment, so that the handshake between the first central control part and the WLAN user equipment is achieved.

14. The wireless network area limiting system according to claim 5, wherein the first central control part detects the WLAN user equipment which has the NFC function and is located in the limited area, and transmits information of each of the plurality of first hardware NFC hot spot sensors to the WLAN user equipment.

15. The wireless network area limiting system according to claim 14, wherein the WLAN user equipment selects optimal information from the information of each of the plurality of first hardware NFC hot spot sensors, and transmits a connection request to a first hardware NFC hot spot sensor corresponding to the optimal information.

* * * * *